United States Patent [19]

Geraci et al.

[11] 3,995,878

[45] Dec. 7, 1976

[54] AIRCRAFT TOWBAR

[75] Inventors: Wayne A. Geraci, Bedford Township, Monroe County; William C. Stoneman, Temperance, both of Mich.

[73] Assignee: Dana Corporation, Toledo, Ohio

[22] Filed: June 9, 1975

[21] Appl. No.: 585,337

[52] U.S. Cl. .............................. 280/488; 244/50; 280/503
[51] Int. Cl.² ......................................... B60D 1/16
[58] Field of Search .................. 244/50; 180/14 C; 280/488, 476 R, 478 R, 503, 483; 214/377

[56] References Cited

UNITED STATES PATENTS

| | | | |
|---|---|---|---|
| 2,287,955 | 6/1942 | Zunino | 180/14 C |
| 2,773,703 | 12/1956 | Ferguson et al. | 180/14 C |
| 2,877,911 | 3/1959 | Arnot | 180/14 C |
| 3,191,967 | 6/1965 | Penk | 280/488 |

FOREIGN PATENTS OR APPLICATIONS 9,930   2/1915   United Kingdom .............. 280/488

OTHER PUBLICATIONS

Danair, *Lightweight Towbars*, Published 5–1974.

*Primary Examiner*—Trygve M. Blix
*Assistant Examiner*—Galen L. Barefoot
*Attorney, Agent, or Firm*—Richard D. Emch

[57] ABSTRACT

An aircraft towbar includes a forward section, which may be attached to a towing vehicle, and a pivotally connected rearward section which may be attached to an aircraft nosewheel. A C-shaped yoke connected to the forward section engages a compression spring connected to the rearward section. When the forward section is pivoted relative to the rearward section, the yoke compresses the spring urging the sections into a colinear relationship.

8 Claims, 6 Drawing Figures

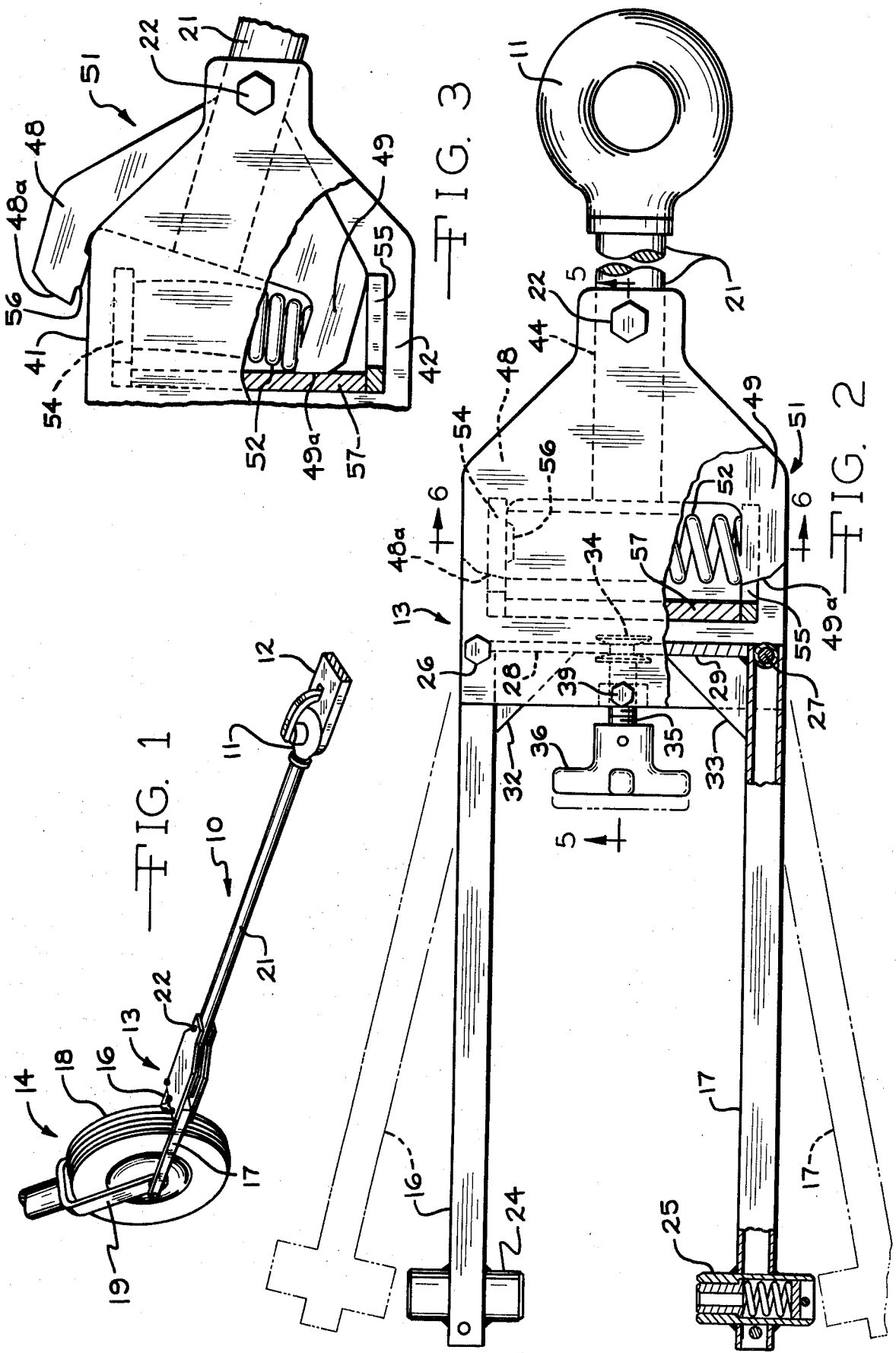

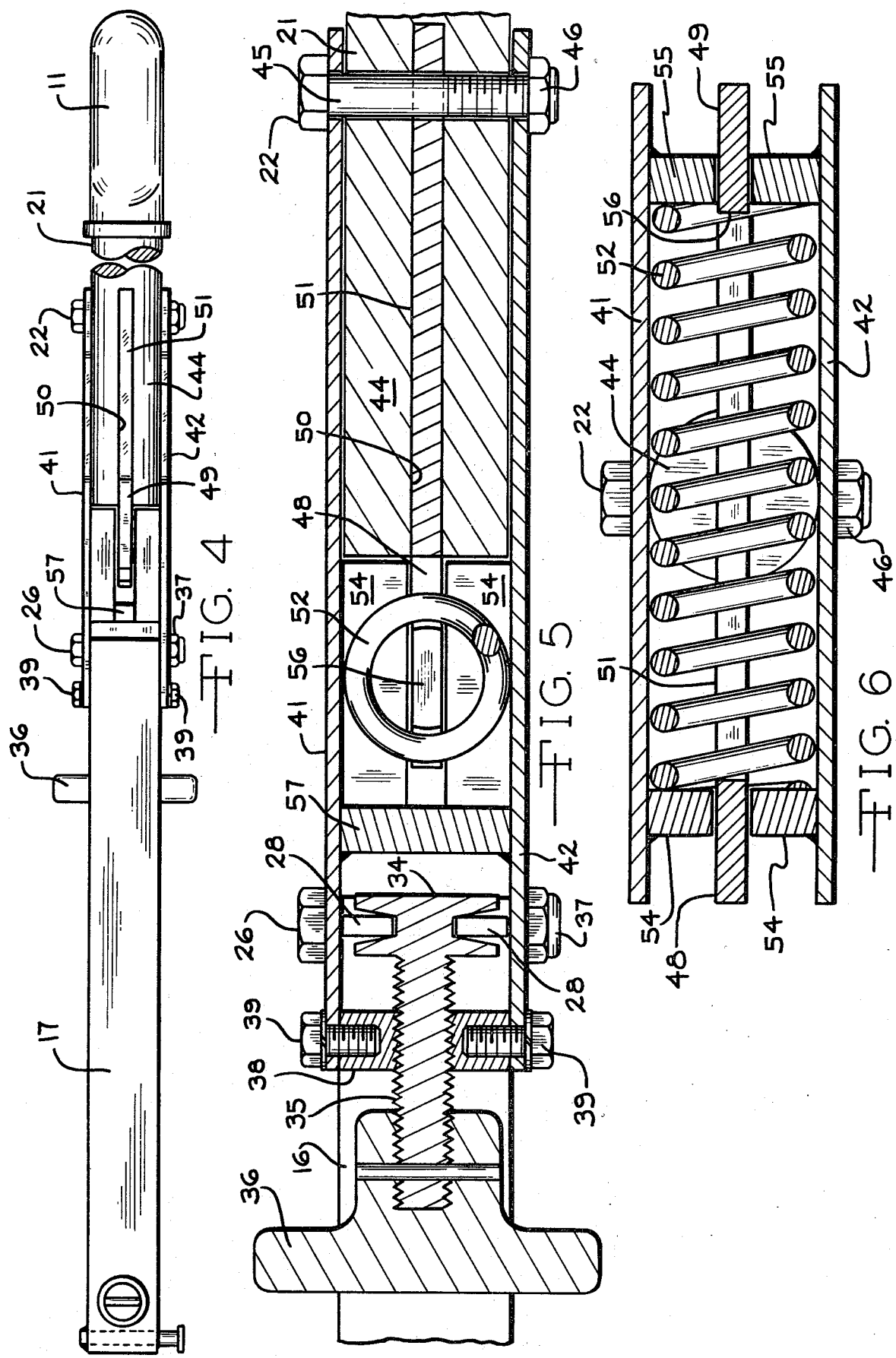

AIRCRAFT TOWBAR

BACKGROUND OF THE INVENTION

The invention relates to aircraft towbars, and more particularly to towbars designed to prevent damage to the nosewheel of a towed aircraft due to overly sharp turning of the towing vehicle.

In the nosewheel landing gear assembly of an airplane, the turning movement of the nosewheel and the nosewheel fork in either direction for steering purposes is limited and a substantial turning force applied to the wheel or wheel fork tending to turn the fork beyond the turning limits will result in damage to the nosewheel assembly. Such a force can occur when a towing vehicle, connected to the nosewheel assembly by a towbar aligned with the nosewheel, turns too sharply. It can also occur in backing the aircraft, even though the vehicle may be moving straight backward.

Aircraft towbars having various means for preventing the above described damage to the nosewheel assembly of a towed aircraft have been suggested. The most common type of such towbar is shown in U.S. Pat. No. 2,468,669. This type towbar includes a pair of shear pins along the length of the towbar, retaining forward and rearward sections of the towbar together. When the towbar is subjected to a certain magnitude of bending stress caused by an attempt to turn the aircraft nosewheel too sharply, at least one of the shear pins fails so that damage to the nosewheel assembly does not occur. U.S. Pat. No. 2,773,703 shows such a towbar wherein one of the two shear pins acts as a pivot pin when the second, weaker shear pin fails.

Another type towbar designed to prevent aircraft nosewheel damage and including a pivot pin is shown in U.S. Pat. No. 3,004,773. However, no shear pins are included in this design. Instead, at a position spaced from the pivot point of the towbar, a pair of slidably mounted rollers biased downwardly by a spring and connected to the forward portion of the towbar are normally engaged in a notch or detent of a generally horizontal plate extending from the rearward portion of the towbar. When the rollers are in their normal position in the detent, the forward and rearward sections of the towbar are aligned in colinear relationship. Only if a substantial bending stress is placed on the towbar do the rollers swing out of the detent, allowing the forward section of the towbar to swing with respect to the rearward section about the pivot point. This occurs if the towing vehicle turns too sharply while towing the aircraft. The towbar is not reset until movement of the towing vehicle straightens out the two sections of the towbar to bring the rollers into the detent.

While the safety towbars discussed are generally effective to prevent damage to aircraft nosewheel assemblies, they have certain shortcomings. A shear pin type towbar must of course be reset by installation of new shear pins after removal of the old shear pin fragments. To accomplish this, the two sections of the towbar must be properly aligned, and the procedure can be somewhat troublesome and time consuming. In the other type towbar discussed above, where the pivoting towar is reset only by proper movement of the towing vehicle, a temporary loss of control can occur. For example, if when the two sections of the towbar are pivoted, it is desirable to move the aircraft backward, a jackknifing of the pivoted towbar assembly can very easily result, even after the aircraft nosewheel has moved back toward center. Steering control in the forward direction is also lacking until the towbar has been reset. In addition, this type safety towbar may be inconsistent in the bending stress values at which the pivoting feature is deployed. Such deployment is subject to variations due to wear and changing atmospheric conditions which affect friction.

SUMMARY OF THE INVENTION

The present invention provides a safety aircraft towbar which is simple in construction and effective in operation, affording a continuing high degree of control and requiring no resetting. The towbar construction includes a rearward section having a pair of arms with ends which grip the nosewheel fork or axle of an aircraft nosewheel assembly in a conventional manner. A screw threaded crank handle brings the arms toward one another to engage the nosewheel assembly or spreads the arms to disengage them upon reverse rotation of the crank handle. A forward elongate section of the towbar is pivoted to the rearward section and includes a conventional hitch for connection to the hitch of a towing vehicle. Coacting between a rearwardly extending lever of the forward section and a pair of mounting brackets on the rearward section is a heavy duty compression coil spring which biases the forward section of the towbar toward aligned, generally colinear relationship with the rearward section. The spring is compressed when the forward section is pivoted in either direction with respect to the rearward section. This occurs when the towing vehicle turns too sharply in the forward direction or maneuvers the towbar in the reverse direction in such a way as to tend to turn the aircraft nosewheel beyond its limit of turning. Damage to the nosewheel assembly is thus avoided simply and effectively. Since the compression spring is constantly urging the two sections toward alignment, control of the towbar and of the aircraft is continuously maintained during backing.

DESCRIPTION OF THE DRAWINGS

FIG. 1 is a perspective view showing the aircraft towbar of the invention connected to an aircraft nosewheel assembly and to a hitch of a towing vehicle;

FIG. 2 is a partially broken away plan view of the aircraft towbar;

FIG. 3 is a detailed partially broken away plan view showing a portion of the towbar in a pivoted position;

FIG. 4 is a side elevational view of the towbar;

FIG. 5 is a sectional elevational view taken along the line 5—5 of FIG. 2; and

FIG. 6 is a sectional elevational view taken along the line 6—6 of FIG. 2.

DESCRIPTION OF THE PREFERRED EMBODIMENT

In the drawings, FIG. 1 shows an aircraft towbar generally indicated by the reference number 10 with a front hitch fitting 11 connected to a conventional hitch 12 of a towing vehicle (not shown) and a rear assembly 13 in engagement with a nosewheel asseembly 14 of an airplane (not shown). Arms 16 and 17 of the rear assembly 13 of the towbar 10 straddle the nosewheel 18 to engage opposite sides of the fork 19 of the assembly 14 or of the axle (not shown) on which the wheel 18 is mounted. The towbar 10 includes an elongated forward section 21, comprising an elongate bar, which is pivotally connected to the rear assembly 13 at a pivot point 22.

FIG. 2 shows the towbar 10 on a larger scale, with the forward elongate bar 21 shown broken and the rear assembly 13 shown in detail. The arms 16 and 17 of the assembly 13 include conventional coupling adaptors 24 and 25 which are designed to accomodate two different sizes of cylindrical studs, or a pair of bores, of an aircraft nosewheel assembly similar to the assembly 14 shown in FIG. 1. Coupling adaptors such as the adaptors 24 and 25 are shown in U.S. Pat. No. 3,331,619.

The arms 16 and 17 are swingable toward and away from one another about pivot pins 26 and 27 to engage and disengage the coupling adaptors 24 and 25 of the nosewheel assembly. To this end, the arms 16 and 17 include short lever arms 28 and 29, respectively, which may be connected to the arms 16 and 17 by welding thereto at about right angles and may include bracing corner plates 32 and 33 for strength and stability. The ends of the lever arms 28 and 29, which may be arcuately notched, are received by a movable bracket 34 in the shape of a V-pulley. The bracket 34 is connected to a threaded rod 35 which can be rotated by a crank handle 36 to move the bracket 34 forward and backward, thereby opening and closing, respectively, the arms 16 and 17.

The bracket 34 and connected components are best seen in FIG. 5. The pivot pin 26, which may comprise a bolt having a nut 37 connected thereto, is visible beyond the bracket 34. As indicated, both the crank handle 36 and the bracket 34 may be rigidly connected to the screw threaded shaft 35. Alternatively, the bracket 34 may be connected to the screw shaft 35 in a freely rotatable connection, since the only function of the bracket 34 is to move the ends of the lever arms 28 and 29 axially with respect to the shaft 35. The shaft 35 is in threaded engagement with a threaded block 38 connected by fasteners 39 to upper and lower structural plates 41 and 42 of the rear assembly 13. The nosewheel engaging assembly thus described is simple in construction and highly convenient and efficient in operation.

As also seen in FIGS. 2 and 5, an extension 44 of the front bar 21 of the towbar 10 extends beyond the pivot point 22, which may comprise a bolt 45 with a nut 46 connected thereto, rearwardly between the upper and lower structural plates 41 and 42. This extension 44 is swingable between the two plates 41 and 42, and to it is connected, preferably by welding, a C-shaped swingable yoke 51, best viewed in FIG. 3, including a pair of yoke legs 48 and 49. The bar extension 44 is preferably split, with a horizontal opening 50 to receive the yoke 51, which may be welded thereto. As FIG. 3 indicates, the C-shaped yoke 51 is positioned to engage a heavy duty compression coil spring 52 when the bar 21 comprising the forward section of the towbar 10 is pivoted about the pivot point 22. The compression spring 52 is also seen in FIGS. 2, 5 and 6, being retained in position adjacent the yoke 51 in the rear assembly 13 by a pair of split brackets 54 and 55. To retain the spring 52 in engagement with the yoke 51, nipples 56 extend from the yoke legs 48 and 49, as shown in FIGS. 2, 3, 5 and 6. The split brackets 54, which preferably retain the spring 52 in a somewhat compressed condition, are fastened to the upper and lower structural plates 41 and 42 preferably by welding. The structural plates 41 and 42 in turn are maintained in properly spaced relationship, to permit the free swinging passage of the angled plates 48 and 49 therethrough, by a spacing member 57 as well as by the connections at the pivot pins 26 and 27, at the fasteners 39 and at the pivot point 22. As shown in FIGS. 2 and 6, the C-shaped yoke 51 is sized and positioned to closely surround the ends of the compression spring 52 in the normal, straightened configuration of the towbar 10. This keeps the towbar 10 relatively rigid with virtually no pivotal slack between the forward end 21 and the rear assembly 13.

As the two sections 21 and 13 of the towbar 10 increasingly pivot with respect to one another, the spring 52 provides an increasing resistance force against the pivoting. The stiffness or spring constant of the spring 52 is of course chosen in accordance with the strength of the nosewheel assembly of the type of aircraft on which the towbar 10 will be used.

The safety towbar assembly 10 of the invention may include a means for limiting the degree of relative pivotal movement between the forward section 21 and the rear assembly 13. In the preferred embodiment shown in the drawings, such a means comprises angularly shaped ends 48a and 49a on the yoke legs 48 and 49, as shown in FIGS. 2 and 3. FIG. 3 illustrates that as the forward section 21 swings about the pivot point 22 to the right to the maximum permissible extent, the yoke end 49a meets and abuts against the spacing member 57, preventing further pivoting. Simlarly, if the forward section 21 is swung to the maximum extent to the left, the yoke end 48a will meet the spacing member 57 to prevent further swinging.

This swing limiting means is preferably included on the towbar 10 to prevent damage from occurring to both the towbar 10 and to the aircraft being towed. The permissible pivoting illustrated in FIG. 3 is quite significant; in such a position the towing vehicle may be close to a wing of the airplane, depending upon the size and shape of the airplane. The swing limitation prevents an inattentive driver from actually driving the towing vehicle into a wing. It prevents damage to the towbar in that, as shown in FIG. 3, it avoids permanent deformation or unseating of the spring 52. If a driver towing an aircraft turns the towing vehicle sharply enough to even approach the maximum pivoted position of the towbar 10 shown in FIG. 3, the angularity of the towbar and the fact that the turning of the vehicle has exceeded the turning limit of the nosewheel assembly is very apparent from the peripheral vision of the driver. If the towbar 10 is used with very light aircraft which may be towed by hand, the operator can easily feel when he has pivoted the towbar by sharp turning.

In operation of the aircraft towbar 10, a high degree of control is always maintained over the towbar and the aircraft being towed, even when sharp turning has caused the pivoting of the towbar 10. This is due to the fact that the heavy duty compression spring 52 is constantly urging the forward section 21 of the towbar toward aligned, generally colinear relationship with the rear assembly 13. Thus, after significant pivoting of the two sections of the towbar, the sections are immediately realigned into the straightened configuration as soon as the aircraft nosewheel assembly and the position of the towing vehicle permit. This important control feature does not prevail with prior art pivoted towbar assemblies which are not biased toward the straightened position, as discussed above. Towbars with replaceable shear pins, once one of the shear pins has failed, are hopelessly out of control especially during backing. Similarly, control of pivotal towbars including locking detents is lost until the towing vehicle pulls forwardly and obtains such a position that the forward section finds its place in the detent in alignment with the rear section.

We claim:

1. An aircraft towbar, comprising a forward elongate section having means for pivotal connection to a towing vehicle, a rearward section having means for connection to an aircraft nosewheel, a generally vertically oriented pivot pin connnecting said forward elongate section to said rearward section, said forward elongate section including a generally C-shaped yoke portion extending rearward of the pivot pin, said rearward section including a compression coil spring and mounting means retaining said spring horizontal and generally normal to said rearward section in position for compressing engagement at either end by said C-shaped yoke portion so that when the forward section is pivoted with respect to the rearward section, a side of said C-shaped yoke portion engages and compresses said spring against the opposite side of the mounting means to urge said forward elongate section toward a position parallel and colinear with the rearward section.

2. An aircraft towbar, according to claim 1, including means for limiting the degree to which said forward elongate section pivots in either direction with respect to said rearward section.

3. An aircraft towbar, according to claim 1, wherein said rearward section includes a pair of horizontally swingable arms having means for engaging the aircraft nosewheel at their rearward ends and an inwardly extending lever arm at their forward ends, a handle assembly positioned adjacent said inwardly extending lever arms, said handle assembly including means for engaging said lever arms, whereby said swingable arms are moved inwardly or outwardly by operation of the handle.

4. The towbar of claim 1 wherein said spring mounting means comprises a pair of brackets affixed to said rearward section and in engagement with the ends of said compression spring, each bracket including an upper and a lower portion spaced from one another with the C-shaped yoke portion extending therebetween, and means maintaining the spacing of the upper and lower bracket portions.

5. An aircraft towbar comprising, a forward elongate section having means for connection to a towing vehicle, a rearward section pivotally mounted to said forward elongate section, said rearward section having means for connection to an aircraft nosewheel, said forward elongate section including a generally C-shaped yoke, said C-shaped yoke having opposed legs, a compression spring mounted on said rearward section, said spring being mounted generally horizontal and normal to said rearward section, said spring having ends in position for engagement by said legs of said C-shaped yoke, whereby when said forward section is pivoted relative to said rearward section, a leg of said C-shaped yoke compresses said spring urging said forward elongate section toward a position parallel and colinear with said rearward section.

6. An aircraft towbar, according to claim 5, including means for limiting the degree to which said forward elongate section pivots in either direction with respect to said rearward section.

7. An aircraft towbar, according to claim 5, wherein said rearward section includes a pair of horizontally swingable arms having means for engaging the aircraft nosewheel at their rearward ends and an inwardly extending lever arm at their forward ends, a handle assembly positioned adjacent said inwardly extending lever arms, said handle assembly including means for engaging said lever arms, whereby operation of said handle assembly moves said horizontally swingable arms.

8. An aircraft towbar, according to claim 7, wherein said handle assembly includes a screw thread shaft operatively mounted on said rearward section and a handle mounted on said shaft, said engaging means comprising a circular member mounted on said shaft, said circular member defining a slot in its periphery for receiving said lever arms.

* * * * *